United States Patent [19]
Beisch et al.

[11] Patent Number: 4,723,818
[45] Date of Patent: Feb. 9, 1988

[54] WHEEL TRIM CENTER RETENTION SYSTEM

[75] Inventors: Hans R. Beisch, Bloomfield Hill; Heinrich J. Hempelmann, Livonia, both of Mich.

[73] Assignee: NI Industries, Inc., Novi, Mich.

[21] Appl. No.: 347,683

[22] Filed: Feb. 11, 1982

Related U.S. Application Data

[63] Continuation-in-part of Ser. No. 15,633, Feb. 27, 1979, abandoned.

[51] Int. Cl.⁴ ............................................... B60B 7/06
[52] U.S. Cl. ........................... 301/37 AT; 301/37 SS; 301/37 SC
[58] Field of Search ............ 301/37 R, 37 SS, 37 AT, 301/37 CM, 37 N, 37 P, 37 S, 37 SC

[56] References Cited

U.S. PATENT DOCUMENTS

| | | | |
|---|---|---|---|
| 1,430,837 | 10/1922 | Oakes . | |
| 1,477,287 | 12/1923 | Sauzedde et al. . | |
| 1,929,701 | 10/1933 | McCalister | 301/108 |
| 2,102,469 | 12/1937 | Lyon . | |
| 2,106,586 | 1/1938 | Zerk . | |
| 2,107,015 | 2/1938 | Short . | |
| 2,109,664 | 3/1938 | Fergueson . | |
| 2,109,684 | 3/1938 | Short . | |
| 2,118,596 | 5/1938 | Fergueson . | |
| 2,118,606 | 5/1938 | Jandus et al. | 70/168 |
| 2,124,035 | 7/1938 | Hurd | 70/169 |
| 2,124,789 | 7/1938 | Lyon | 301/37 TP |
| 2,159,881 | 5/1939 | Booth | 301/37 AT |
| 2,171,786 | 9/1939 | Ellenberger . | |
| 2,175,353 | 10/1939 | Jacobi | 70/169 |
| 2,217,775 | 10/1940 | Smith | 70/168 |
| 2,249,568 | 7/1941 | Shinliver | 301/37 SC |
| 2,305,110 | 12/1942 | Schatzman | 70/171 |
| 2,328,301 | 8/1943 | Shaw | 70/259 |
| 2,329,945 | 9/1943 | Schatzman | 301/37 AT |
| 2,535,126 | 12/1950 | Flowers et al. | 70/169 |
| 2,594,407 | 4/1952 | Earnest | 70/169 |
| 2,659,229 | 11/1953 | Skillman et al. | 70/259 |
| 2,698,768 | 1/1955 | McLeod | 301/37 SS |
| 2,711,349 | 6/1955 | Groven | 301/37 SS |
| 2,713,515 | 7/1955 | Lyon | 301/37 SS |
| 2,722,822 | 11/1955 | Thomas | 70/167 |
| 2,727,790 | 12/1955 | Gaylord | 301/37 SC |
| 2,729,510 | 1/1956 | Lyon | 301/37 AT |
| 2,751,256 | 6/1956 | Adams | 301/37 SS |
| 2,756,110 | 7/1956 | Lyon | 301/37 AT |
| 2,778,215 | 1/1957 | Redmond | 70/231 |
| 2,792,261 | 5/1957 | Tell et al. | 301/37 SS |
| 2,797,572 | 7/1957 | Prall | 70/258 |
| 2,847,096 | 8/1958 | Lyon | 301/32 AT |
| 2,851,309 | 9/1958 | Lyon | 301/37 AT |
| 2,874,561 | 2/1959 | Alger | 70/169 |

(List continued on next page.)

FOREIGN PATENT DOCUMENTS

| | | |
|---|---|---|
| 672204 | 12/1929 | France . |
| 1263040 | 4/1961 | France . |
| 13647 | 6/1914 | United Kingdom . |
| 526576 | 9/1940 | United Kingdom . |
| 630176 | 10/1949 | United Kingdom . |
| 791863 | 3/1958 | United Kingdom . |
| 864129 | 3/1961 | United Kingdom . |
| 1028861 | 10/1964 | United Kingdom . |
| 1464632 | 2/1977 | United Kingdom . |
| 2046185 | 11/1980 | United Kingdom . |

*Primary Examiner*—Charles A. Marmor
*Attorney, Agent, or Firm*—Harness, Dickey & Pierce

[57] ABSTRACT

A wheel trim assembly is described having an annular wheel trim member which is removably attached to a central hub member by a centrally located fastener or bolt. The central hub member is adapted to attach to an associated wheel. The annular trim member has a central aperture having a removable cover member disposed therein to conceal the centrally located fastener or bolt from casual view. Also disclosed is a locking bolt which has an outer face with a groove therein adapted to receive a corresponding projection of a wrench to effect rotation thereof and which is maintained in aligment by a bolt retainer located in the interior of the trim member. Several arrangements for preventing rotation of the trim member relative to an associated wheel are also disclosed.

37 Claims, 47 Drawing Figures

U.S. PATENT DOCUMENTS

| | | | |
|---|---|---|---|
| 2,911,260 | 11/1959 | Lyon | 301/37 AT |
| 2,971,798 | 2/1961 | Lyon | 301/37 AT |
| 2,995,402 | 8/1961 | Lyon | 301/37 AT |
| 3,092,420 | 6/1963 | Baldwin et al. | 301/37 SC |
| 3,112,637 | 12/1963 | Thomas | 70/258 |
| 3,170,733 | 2/1965 | Lamme | 301/37 AT |
| 3,202,460 | 8/1965 | Holbrow | 301/37 S |
| 3,241,408 | 3/1966 | McCauley | 81/71 |
| 3,248,915 | 6/1966 | Scheiman | 70/168 |
| 3,268,262 | 8/1966 | Gonas et al. | 301/37 SS |
| 3,287,067 | 11/1966 | Brown | 301/37 SC |
| 3,294,452 | 12/1966 | Schmidt et al. | 301/37 SS |
| 3,317,247 | 5/1967 | Lamme | 301/37 SC |
| 3,336,771 | 8/1967 | Selleck | 70/259 |
| 3,352,133 | 11/1967 | Selleck | 70/259 |
| 3,426,561 | 2/1969 | Kinait | 70/259 |
| 3,513,673 | 5/1970 | Trainor | 70/259 |
| 3,534,570 | 10/1970 | Mauro | 70/167 |
| 3,722,958 | 3/1973 | Marshall | 301/37 N |
| 3,833,266 | 9/1974 | Lamme | 301/37 AT |
| 3,874,258 | 4/1975 | Semola et al. | 81/121 R |
| 3,918,764 | 11/1975 | Lamme | 301/37 AT |
| 3,965,708 | 6/1976 | Smiley | 301/37 AT |
| 3,995,461 | 12/1976 | Hudson | 301/37 AT |
| 4,061,400 | 12/1977 | D'Angelo | 361/37 AT |
| 4,067,621 | 1/1978 | Reppert | 301/108 A |
| 4,083,606 | 4/1978 | Scruggs | 301/37 AT |
| 4,090,744 | 5/1978 | McCauley | 301/37 AT |
| 4,171,851 | 10/1979 | Scruggs | 301/37 AT |
| 4,179,163 | 12/1979 | Brown | 301/37 SS |
| 4,217,002 | 8/1980 | Simpson | 301/37 CM |
| 4,235,476 | 11/1980 | Arvidsson | 301/108 R |
| 4,274,679 | 6/1981 | Brinson | 301/37 AT |
| 4,291,921 | 9/1981 | Wulf | 301/37 AT |
| 4,306,751 | 12/1981 | Wegner | 301/37 AT |
| 4,346,940 | 8/1982 | Tatar | 301/37 AT |

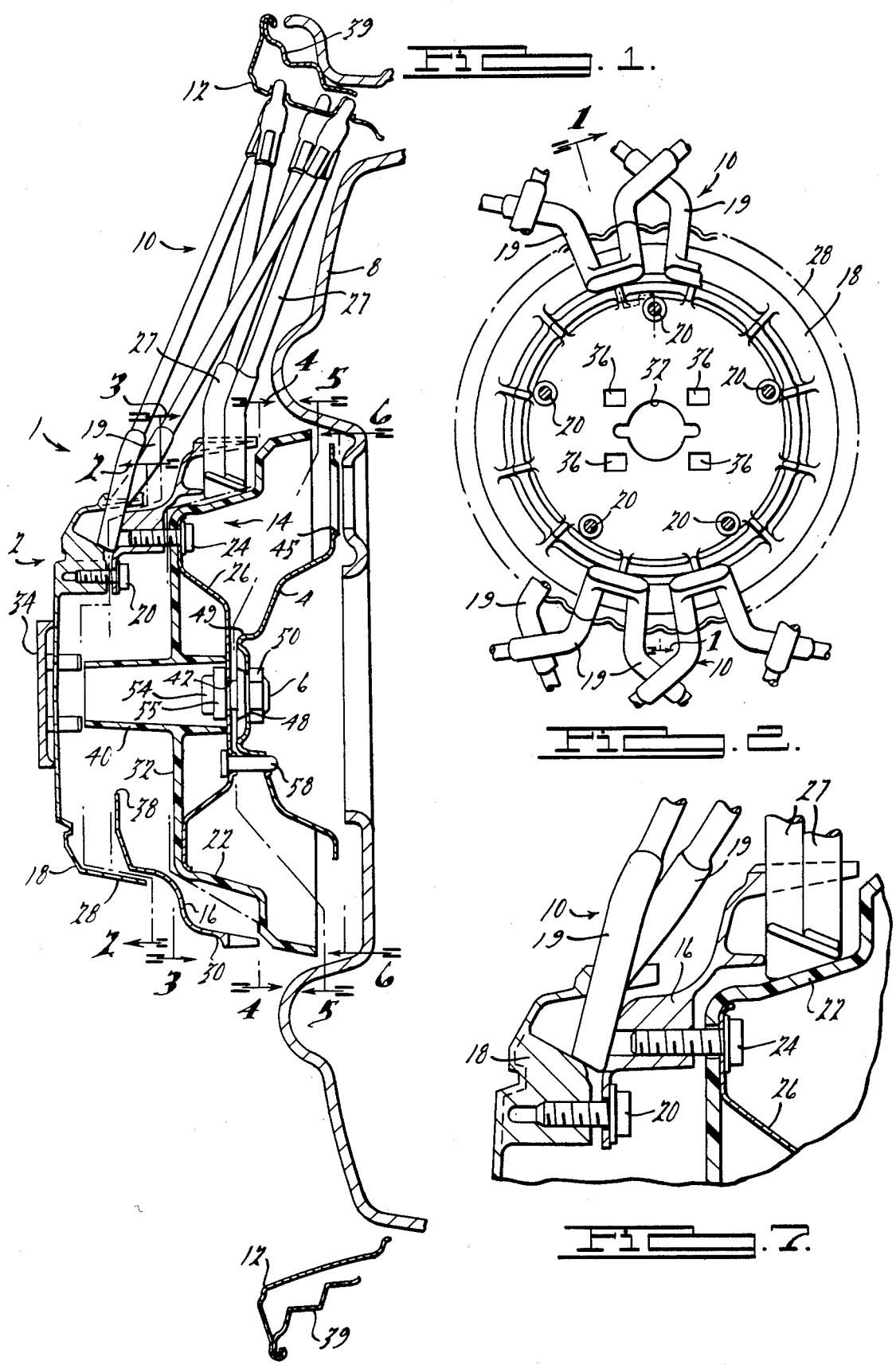

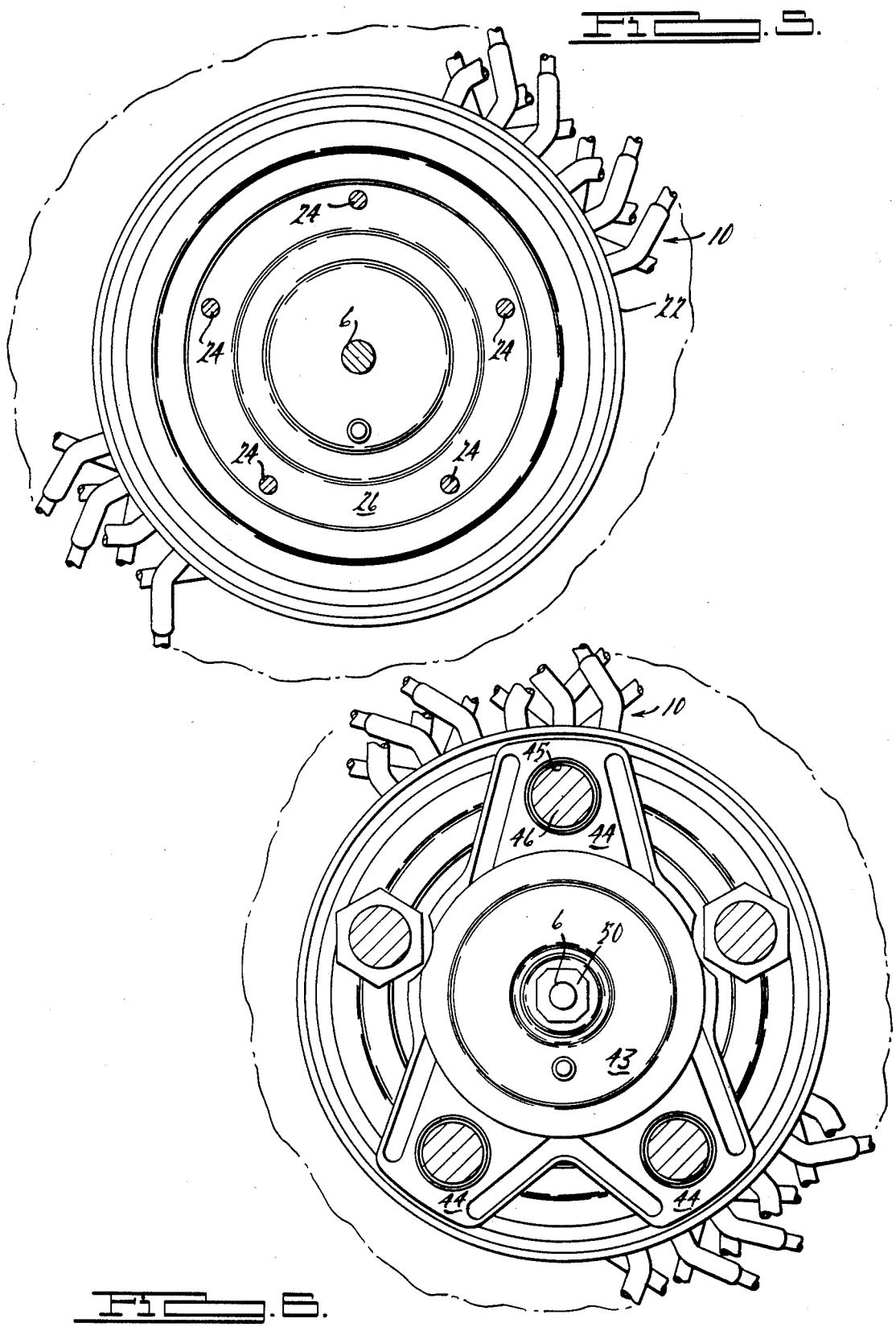

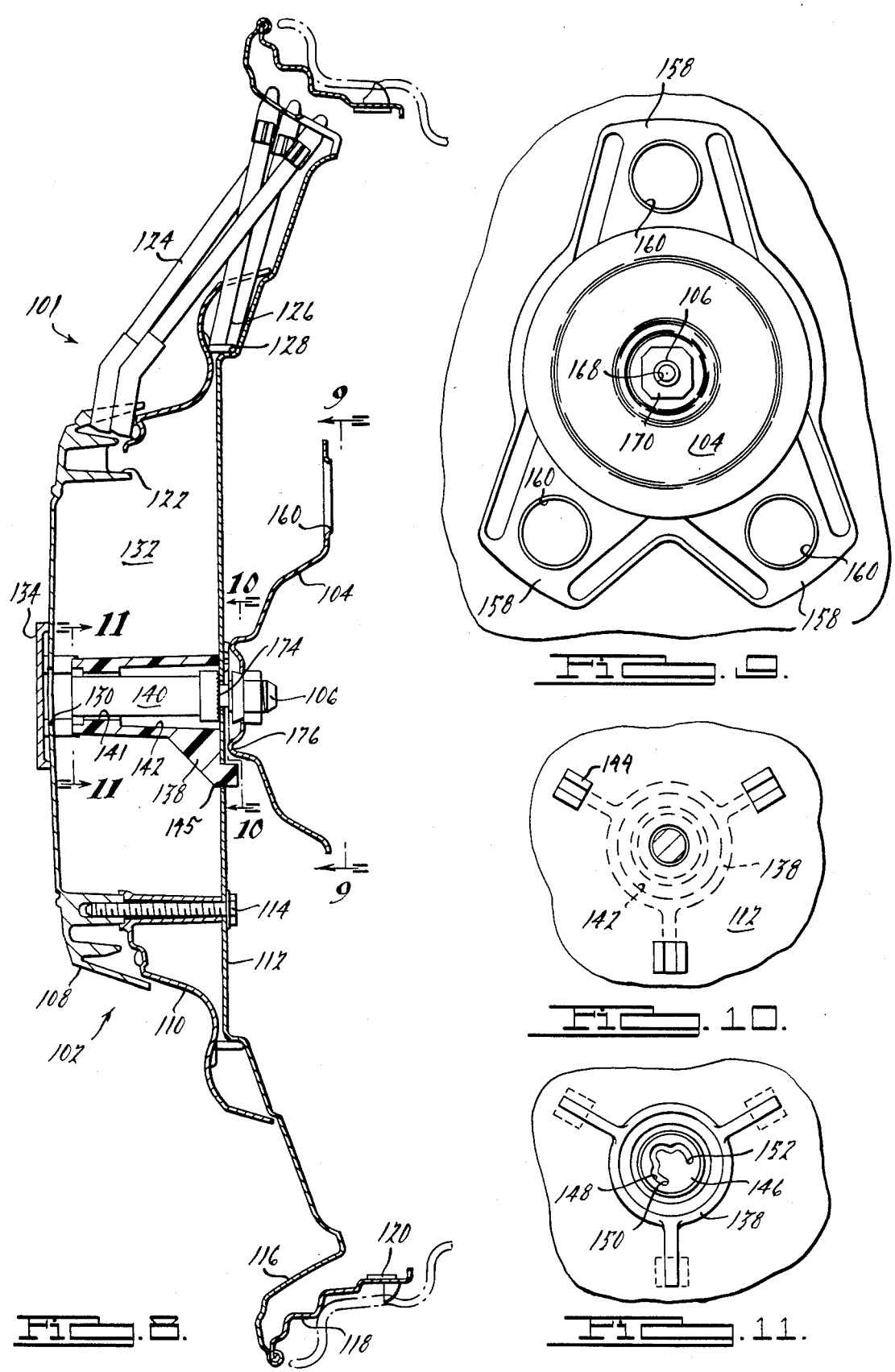

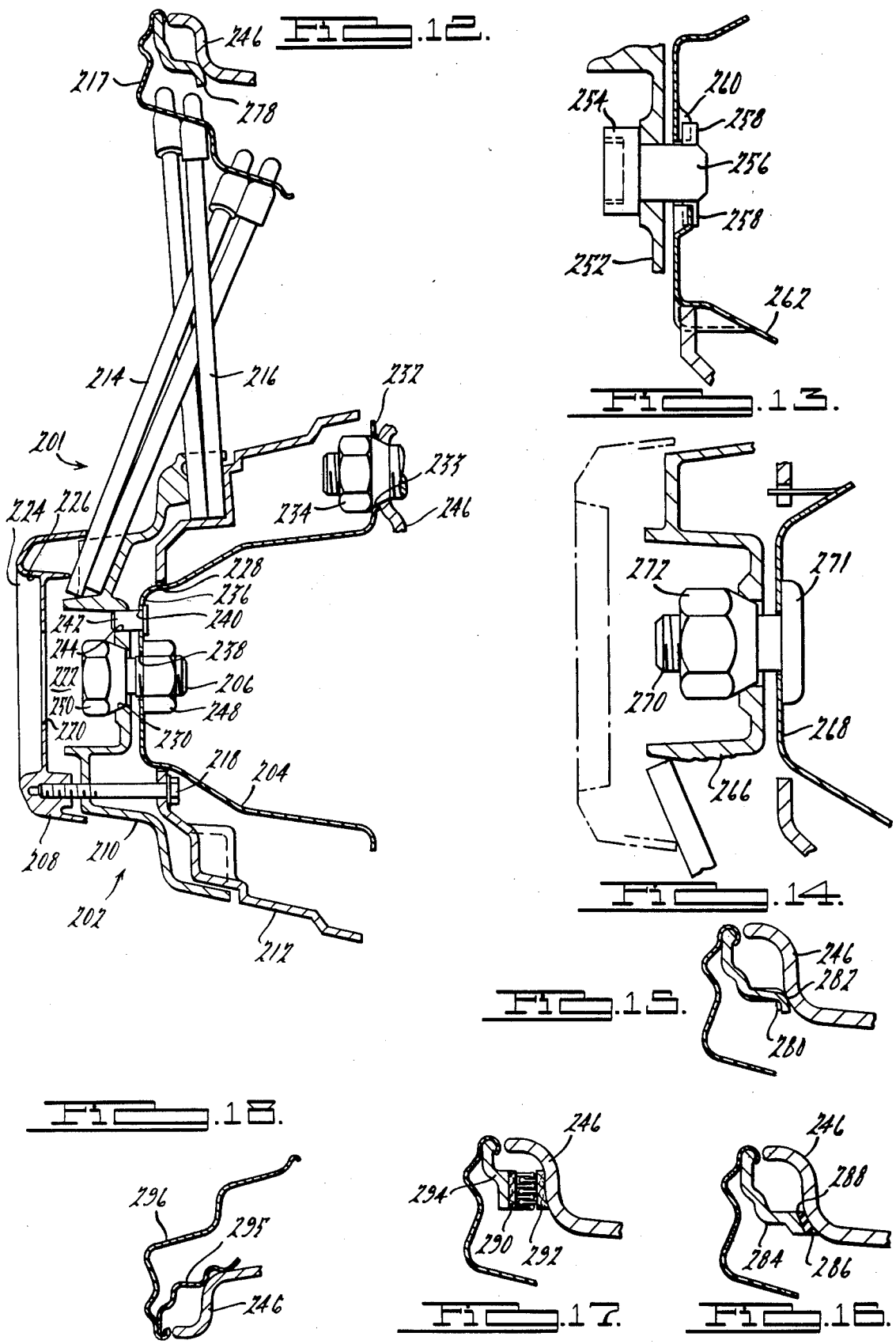

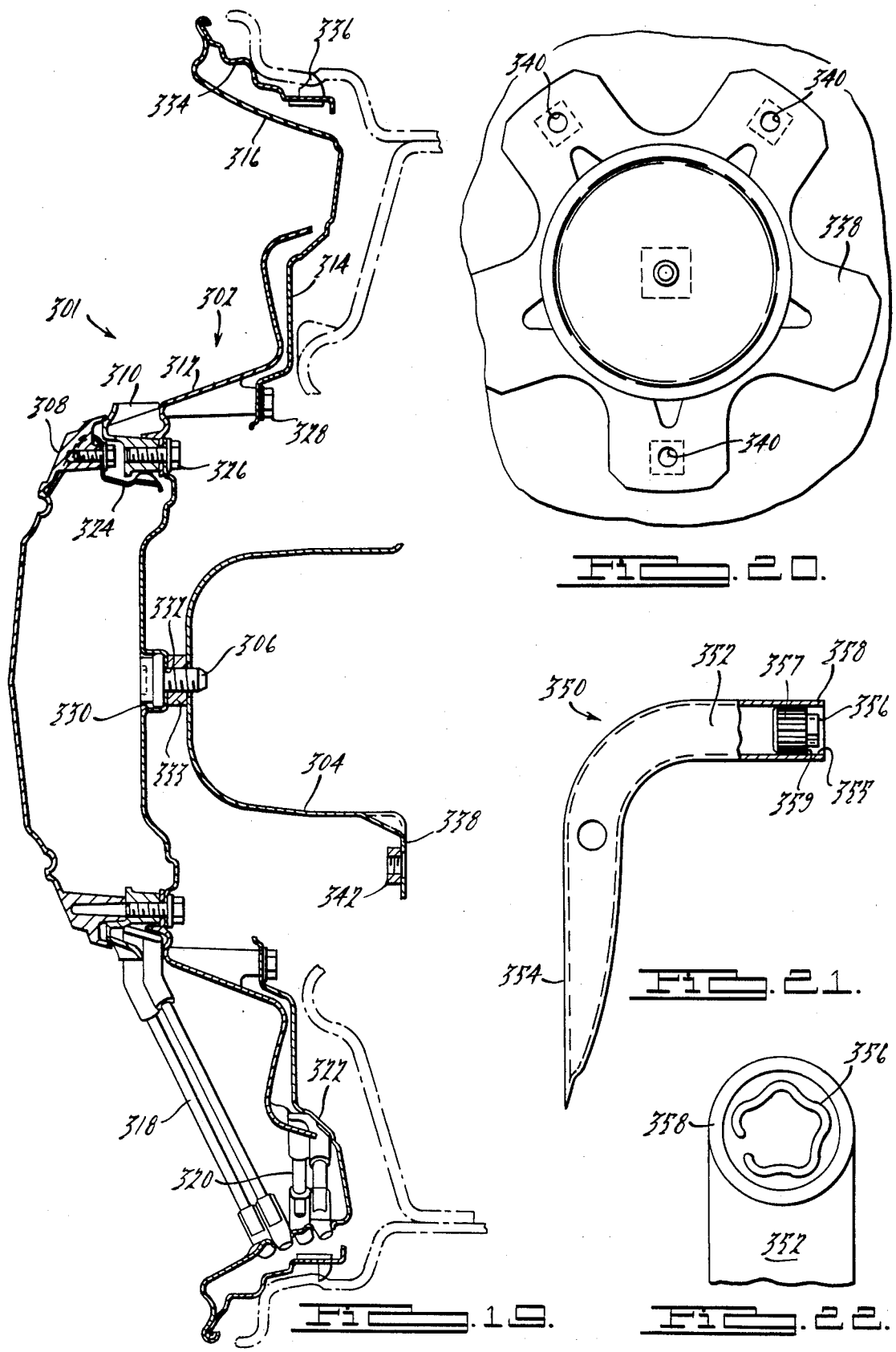

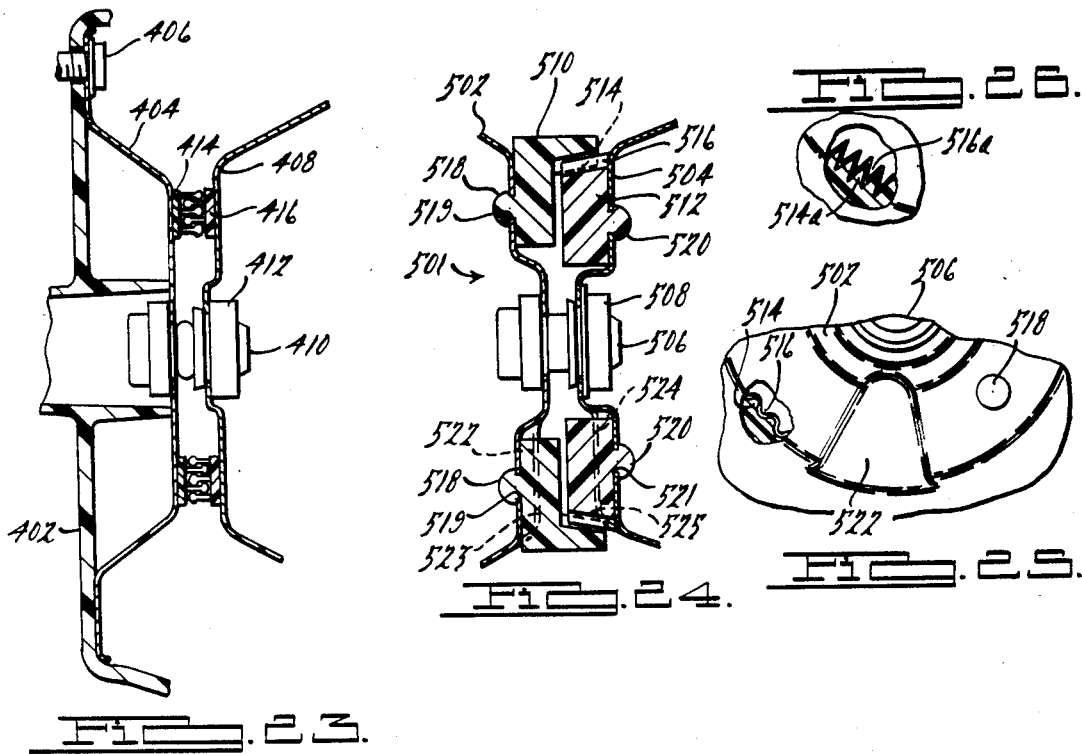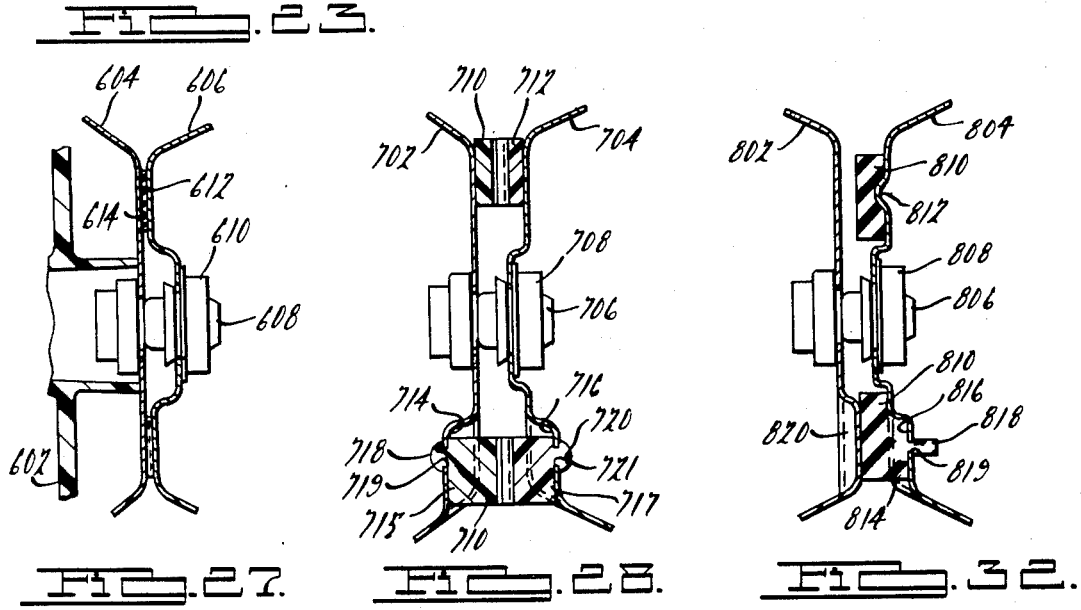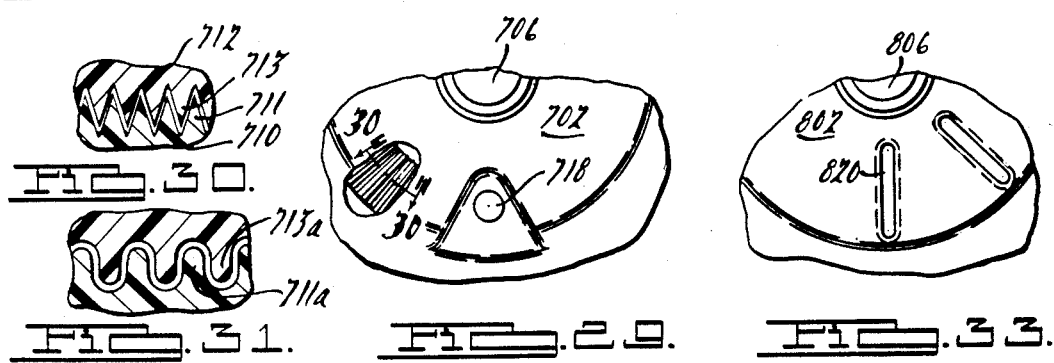

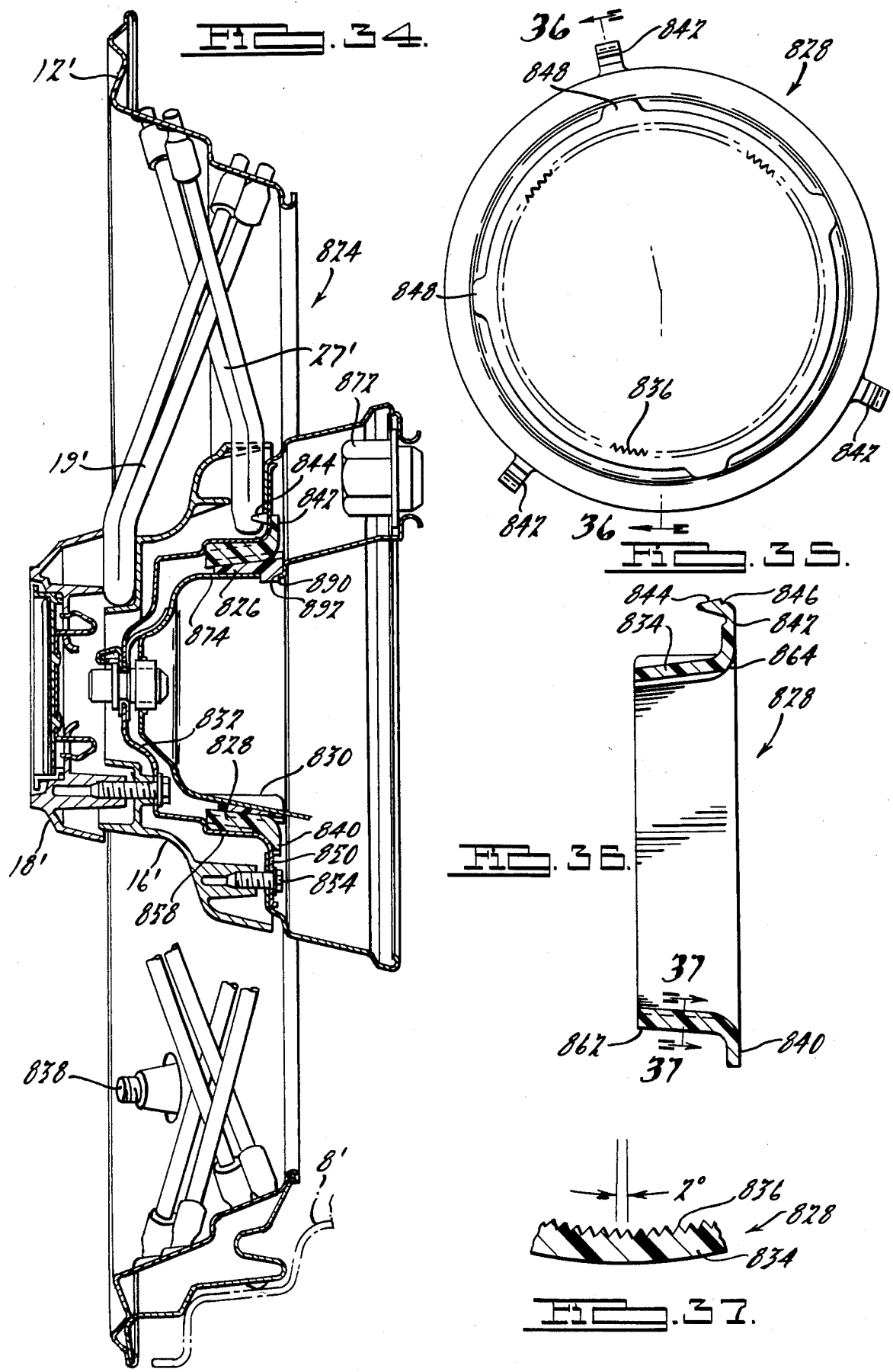

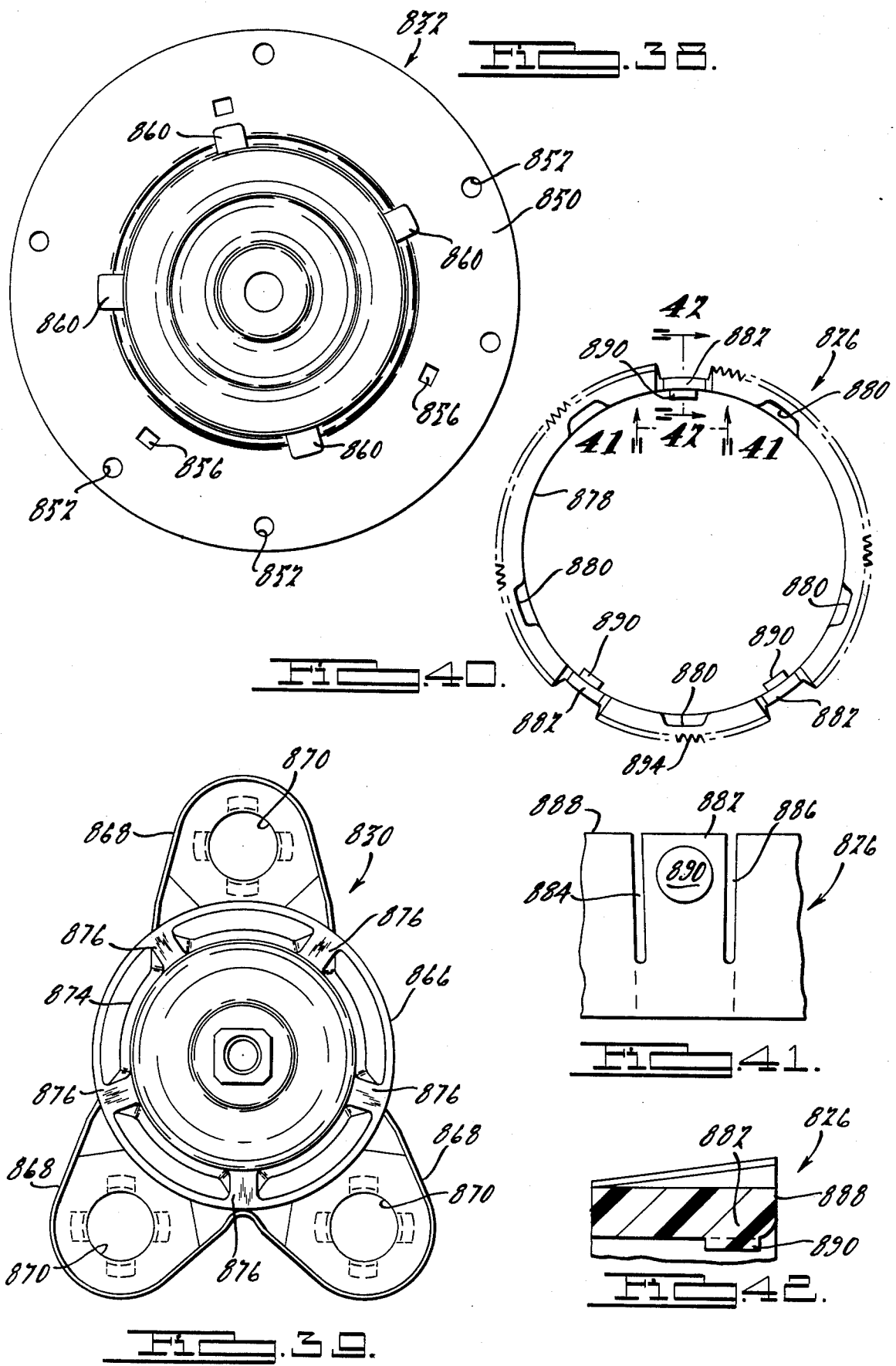

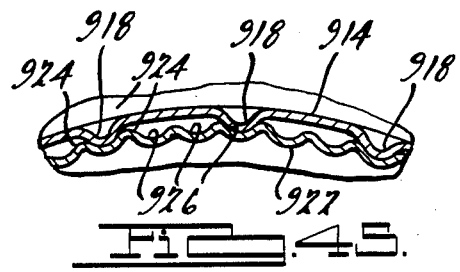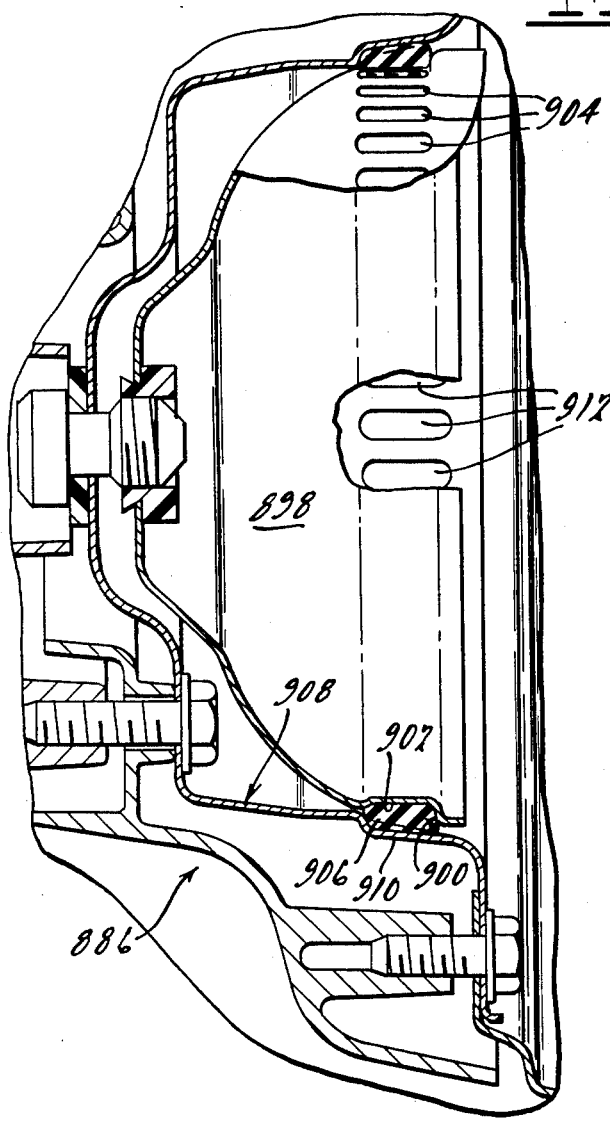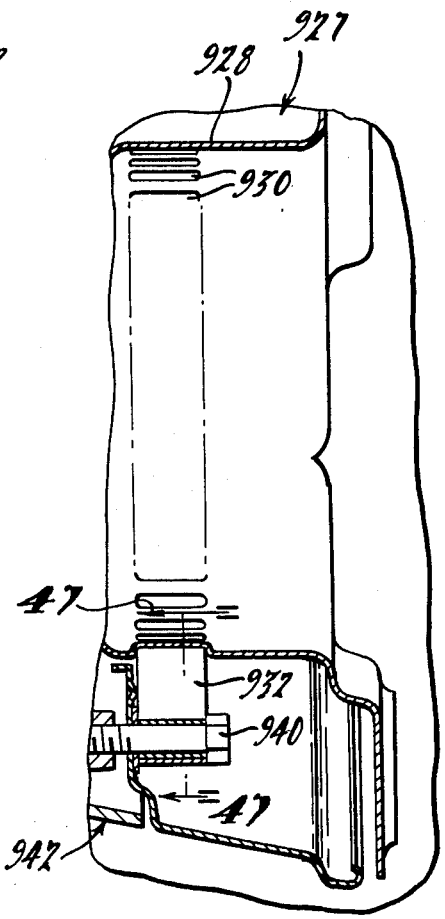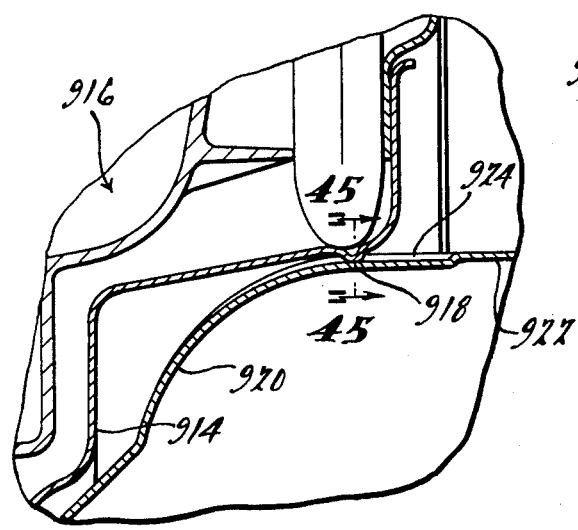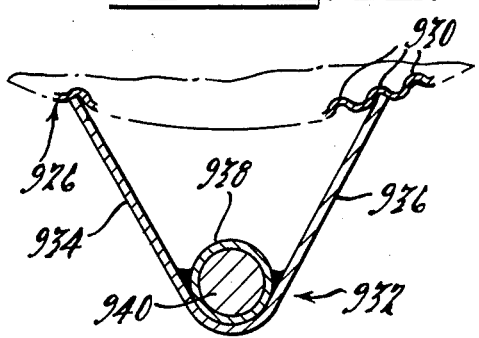

WHEEL TRIM CENTER RETENTION SYSTEM

This application is a continuation-in-part of application Ser. No. 15,633, filed Feb. 27, 1979, entitled "Wheel Cover Lock" now abandoned.

BACKGROUND OF THE INVENTION

The present invention relates to wheel trim members which are adapted to cover at least a portion of a vehicle wheel for decorative purposes. More specifically, the present invention relates to a wheel trim assembly having a centrally disposed retention means for retaining or securing a wheel trim member to an associated wheel. Preferably, the centrally disposed retention means includes a center lock bolt to provide a theft resistant wheel trim assembly.

The loss of wheel trim members has been a problem faced by vehicle owners for many years. It is important to have a wheel trim member with sufficiently strong retention means to withstand the substantial jarring forces which are applied to the wheel trim member when a vehicle is in motion over an uneven road surface. Otherwise the trim member will separate from the associated wheel to which it is attached, resulting in loss of or damage to the trim member.

In addition, the theft of wheel trim members and of wheels themselves has been a problem faced by vehicle owners for many years. Wheel trim members are often valuable and, hence, attractive to dishonest characters engaged in thievery. Therefore, it is very desirable to provide a wheel trim assembly with both secure and theft resistant retention features. As will be appreciated by those skilled in the art, although a theft resistant device does not preclude theft, it may be effective to increase the difficulties encountered by a thief. The increased difficulties may be sufficient to cause the thief to abandon the attempt. Even if the thief does not abandon the venture, the increased difficulties increase the time required to effect the removal of the wheel trim and therefore increase the chances of the thief being caught in the act of thievery. Of course, it will also be appreciated that while a secure and theft-resistant wheel trim member should be effective in discouraging theft, it should also be subject to easy removal by an authorized person.

An additional area of concern with wheel trim utilizing a center retention arrangement for securing the trim member to a vehicle wheel is how to prevent relative rotation between the trim member and the vehicle wheel. While at first impression this may appear to be easily resolved, the problem is compounded by the fact that often the valve stem opening provided in the associated vehicle wheel is not precisely located with respect to the lug nut openings but rather may vary over a substantial angular range (on the order of ±20°). Because with many types of wheel trim, an opening is provided through which the valve stem extends, it is necesssary that the wheel trim be positionable with this opening properly located to accommodate the valve stem.

Wherefore, it is an object of the present invention to provide a wheel trim assembly which may be securely retained on a wheel, is theft resistant, and yet can be easily removed by an authorized person and includes means to effectively inhibit relative rotation of the trim member with respect to the vehicle wheel yet allows a wide range of angular positioning of the trim member with respect to the vehicle wheel. Another object of the present invention is to provide a wheel trim assembly which can be economically manufactured and securely attached to an associated wheel. Yet another object of this invention is to provide a wheel trim assembly which is aesthetically appealing and which incorporates retention means located out of sight of casual observers. Yet another object of this invention is to provide a theft resistant wheel trim assembly which is resistant to the effects of weather elements and road salt and is suitable for long term use in the northern climates where salt is frequently applied to icy roads.

Additional objects, advantages, and features of the present invention will become apparent from the subsequent description and the appended claims taken in conjunction with the accompanying drawings.

BRIEF DESCRIPTION OF THE DRAWINGS

FIG. 1 is a section view of a wheel trim assembly in accordance with the present invention shown in operative relationship with a vehicle wheel, portions thereof being broken away, the section being taken generally along a radial plane extending along the axis of rotation;

FIG. 2 is a section view taken along line 2—2 of FIG. 1;

FIG. 5 is a section view taken along line 5—5 of FIG. 1;

FIG. 6 is a section view taken along line 6—6 of FIG. 1;

FIG. 7 is an enlarged section view, broken away, showing a portion of the structure of FIG. 1;

FIG. 8 is a section view similar to that of FIG. 1 but showing an alternative embodiment of a wheel trim assembly of the present invention;

FIG. 9 is a view in elevation taken along line 9—9 of FIG. 8 and showing the central hub member of the alternative embodiment;

FIG. 10 is a section view taken along line 10—10 of FIG. 8;

FIG. 11 is a section view taken along line 11—11 of FIG. 8;

FIG. 12 is a fragmentary section view also similar to that of FIG. 1 but showing another alternative embodiment of the present invention;

FIG. 13 is a section view, broken away, of an alternative center bolt fastening means;

FIG. 14 is a section view, broken away, of another alternative center bolt fastening means;

FIG. 15 is a section view, broken away, of an alternative wheel cover positioning stop having a spring dampening tab;

FIG. 16 is a section view, broken away, of an alternative wheel cover positioning stop having a compressible stop and dampening pad;

FIG. 17 is a section view, broken away, of an alternative wheel cover positioning stop having a "Velcro ®" pad for positioning, dampening and anti-rotation;

FIG. 18 is a section view, broken away, of an alternative wheel cover positioning stop employing a spring guide, damper, and stop;

FIG. 19 is a section view of another wheel trim assembly showing another alternative embodiment of the present invention;

FIG. 20 is an elevational view, broken away, showing the central hub member of the embodiment of FIG. 19 as seen looking axially outwardly;

FIG. 21 is a side elevational view showing a tool suitable for use in manipulating a lock bolt of the present invention with a part thereof broken away;

FIG. 22 is a fragmentary front elevational view of the tool shown in FIG. 21 showing the lock bolt engaging face thereof;

FIG. 23 is a fragmentary section view showing an optional anti-rotation means for use in the present invention;

FIG. 24 is a fragmentary section view showing an alternative anti-rotation means for use in the present invention;

FIG. 25 is a fragmentary elevational view with portions broken away showing the anti-rotation means of FIG. 24 as viewed looking axially inwardly;

FIG. 26 is an elevational view, broken away, showing alternative gear teeth for use in the anti-rotation means of FIG. 25;

FIG. 27 is a section view, broken away, showing still another alternative anti-rotation means for use in the present invention;

FIG. 28 is a section view, broken away, showing another alternative anti-rotation means for use in the present invention;

FIG. 29 is an elevational view, broken away, of the anti-rotation means of FIG. 28 as viewed looking axially inwardly;

FIG. 30 is a section view taken along line 30—30 of FIG. 29;

FIG. 31 is a section view showing an alternative gear teeth configuration for the anti-rotation means shown in FIG. 29;

FIG. 32 is a section view, broken away, showing another alternative anti-rotation means for use in the present invention;

FIG. 33 is an elevational view, broken away, showing the anti-rotation means of FIG. 32 as viewed looking axially inwardly;

FIG. 34 is a section view of a wheel trim assembly similar to that of FIG. 1 but incorporating a modified embodiment of the anti-rotation arrangement shown in FIG. 24;

FIG. 35 is an enlarged view of the outer gear ring forming a part of the anti-rotation arrangement shown in FIG. 34 as seen looking axially inwardly;

FIG. 36 is a section view of the gear ring of FIG. 35, the section being taken along line 36—36 thereof;

FIG. 37 is an enlarged fragmentary section view of the tooth configuration provided on the gear ring of FIGS. 35 and 36, the section being taken along line 37—37 of FIG. 36;

FIG. 38 is an enlarged view of the retainer plate forming a part of the wheel trim of FIG. 34 as seen looking axially outwardly;

FIG. 39 is an enlarged view of the lock bracket forming a part of the wheel trim assembly of FIG. 34 as seen looking axially inwardly;

FIG. 40 is an enlarged view of the inner gear ring forming a part of the anti-rotation embodiment of FIG. 34 as seen looking axially outwardly;

FIG. 41 is a fragmentary view of an inner portion of the inner gear ring shown in FIG. 40, the view being taken along line 41—41 thereof;

FIG. 42 is a section view of the inner gear ring of FIG. 40, the section being taken along line 42—42 thereof;

FIG. 43 is a fragmentary section view of a wheel trim assembly in accordance with the present invention illustrating a modified embodiment of the anti-rotation arrangement shown in FIG. 32;

FIG. 44 is an enlarged fragmentary section view of a portion of a wheel trim incorporating a modified embodiment of the anti-rotation arrangement shown in FIG. 27;

FIG. 45 is an enlarged section view of the embodiment of FIG. 44, the section being taken along line 45—45 thereof;

FIG. 46 is also a fragmentary section view of a wheel trim incorporating yet another anti-rotation embodiment in accordance with the present invention; and FIG. 47 is a section view of the embodiment shown in FIG. 46, the section being taken along line 47—47 thereof.

DESCRIPTION OF THE PREFERRED EMBODIMENTS

The present invention relates to a wheel trim assembly comprising an annular wheel trim member, a central hub member, and a separable center fastening means such as a bolt and nut. In general, the annular wheel trim member is removably secured to the central hub member by the center bolt fastening means, which is preferably a lock bolt, and the central hub member is securely attached to an associated wheel. The annular wheel trim member has a centrally disposed aperture located on the axially outer side thereof to permit access to the center bolt. As used herein, the terms "axially" and "radially" are intended to be with respect to the axis of a vehicular axle having mounted thereon a wheel to which the wheel trim assembly of this invention is attached. A removable cover member is employed to conceal the centrally disposed aperture and the center bolt from casual view.

Figure 3:
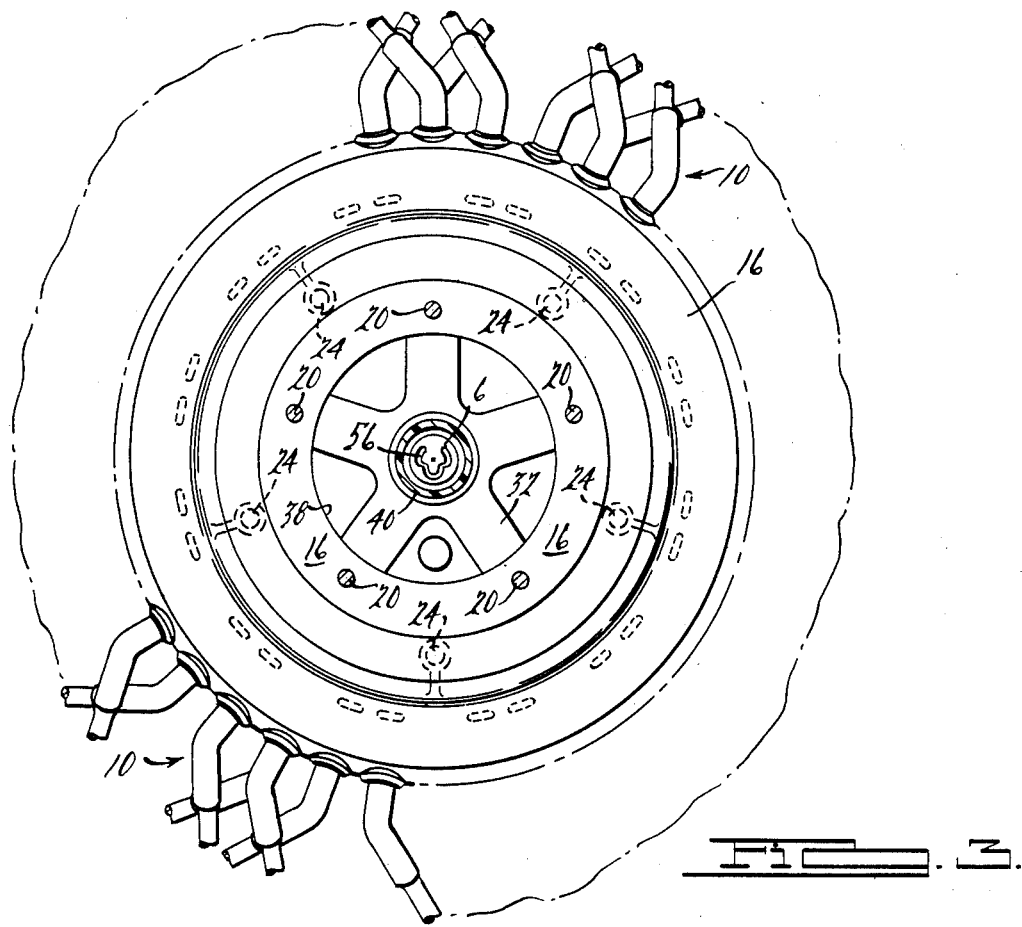
FIG. 3 is a section view taken along line 3—3 of FIG. 1.
Figure 4:
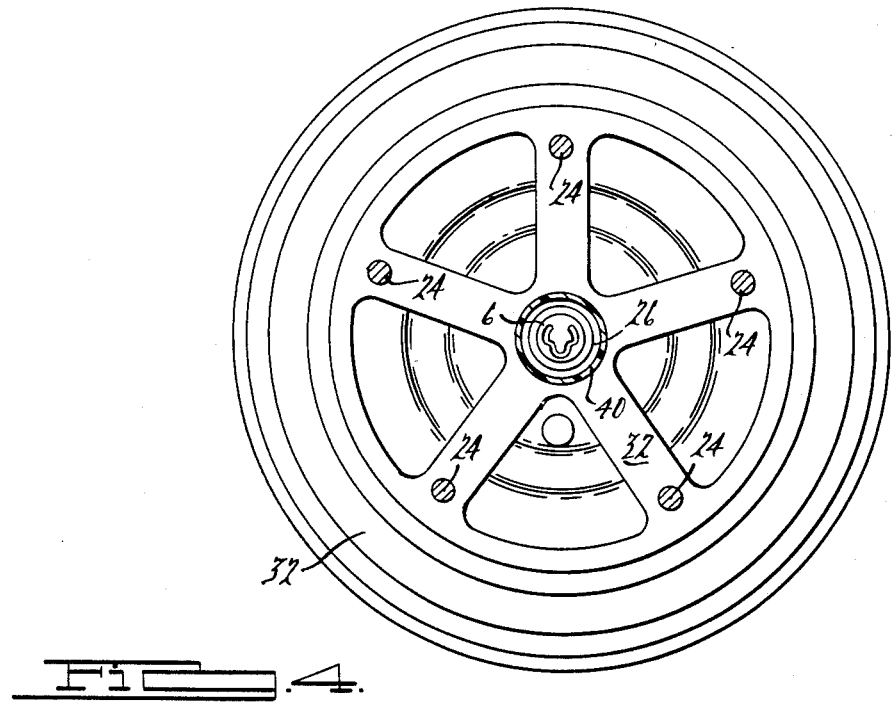
FIG. 4 is a section view taken along line 4—4 of FIG. 1.

Now referring to the drawings, and in particular to FIGS. 1–7, a wheel trim assembly of the present invention is generally indicated by the numeral 1. Wheel trim assembly 1 broadly comprises an annular wheel trim member 2, a central hub member shown as lock bracket 4 and a first detachable element or center bolt shown as lock bolt 6. Wheel trim assembly 1 is intended for decorative use on the axial outward side of a wheel such as wheel 8 shown in FIG. 1.

Although it will be appreciated that the exact construction of annular wheel trim member 2 can vary within the broad scope of the present invention, trim member 2 is designed to present the visual appearance of a spoked wheel and has a plurality of generally radially extending spokes 10 which are retained between annular outer rim 12 and a centrally disposed spoke containment hub generally indicated by the numeral 14. Spoke containment hub 14 comprises an outer portion or top casting 18, lower casting 16, spoke retainer 22 and retainer plate 26. A plurality of circumferentially disposed bolts 20 extend through corresponding apertures in lower casting 16 and threadably engage corresponding aligned apertures in top casting 18 to attach top casting 18 to lower casting 16 and to clampingly retain the plurality of axially outer spoke members 19 therebetween. The axially inwardly directed edge portion 28 of top casting 18 has a plurality of circumferentially spaced apertures through which outer spoke members 19 extend generally radially outwardly. A plurality of circumferentially spaced bolts 24 extend through aligned apertures in retainer plate 26 and spoke retainer 22 and threadably engage aligned apertures in lower casting 16 to attach lower casting 16, spoke retainer 22 and retainer plate 26 and to clampingly secure the plurality of axially inner spoke members 27 between lower casting 16 and spoke retainer 22. The axially inwardly directed edge portion 30 of lower casting 16 has a plurality of circumferentially spaced apertures through which inner spoke members 27 extend generally radially outwardly.

Top casting 18 has a central aperture 32 to permit access to the interior of trim member 2 and hence to center bolt 6 from the axial outer side of top casting 18. Removably attached to the axially outer side of top casting 18 and adapted to cover aperture 32 is a cover member 34 which can be a medallion selected to present a decorative crest or other identifying insignia. Cover member 34 can be removably attached to top casting 18 by spring clips 36 which snappingly fit in corresponding apertures in top casting 18 or by other suitable means for removably fastening a cover member over an aperture.

Lower casting 16 has a large central aperture 38 through which cylindrical portion 40 of spoke retainer 23 freely extends axially outwardly. Spoke retainer 22 is preferably made of lighweight plastic. The axially inner end of cylindrical retaining portion 40 of spoke retainer 22 abuts against retainer plate 26 and is retained thereagainst by a plurality of bolts 24 as set forth above. Retainer plate 26 has a central aperture 42 through which lock bolt 6 extends. As is apparent from FIG. 1, cylindrical portion 40 of spoke retainer 22 operates to retain lock bolt 6 in general axial and radial alignment with openings 32 and 42 as well as to guide a torque tool inserted through opening 32 into engagement with lock bolt 6.

Lock bolt 6 has a head portion 54 with a smooth, generally circular circumference and has a portion 55 of greater diameter than aperture 42 so that an axially inwardly directed clamping force can be directed against retainer plate 26 by lock bolt 6. The axially outer face of lock bolt 6 has an irregularly configured groove or channel 56 therein which is adapted to receive a correspondingly shaped ridge or projection in the face of a tool or key wrench for rotating lock bolt 6 to insert or withdraw lock bolt 6 into or out of engagement with lock bracket 4.

As best shown in FIGS. 1 and 6, lock bracket 4 has a central portion 43 and radially outwardly extending leg portions 44 with bores 45 aligned with and adapted to receive wheel lug bolts 46 shown in section in FIG. 6. Central portion 43 of lock bracket 4 has a generally circular bowl-like shape while leg portions 44 are generally coplanar and extend radially outwardly at a right angle to the axis of lug bolts 46 and to the axis of wheel trim assembly 1. Lock bracket 4 has an annular, axially outwardly extending ridge or protrusion 49. Press fit, staked or otherwise fixedly attached to the axially inner side of central portion 43 and coaxial with aperture 48 is a second detachable element such as nut 50 having a threaded bore which is adapted to threadably engage the threaded shank portion of lock bolt 6.

It will be appreciated that in the embodiment shown in FIGS. 1-7, trim member 2 is retained on wheel 8 by means of lock bolt 6 only. Outer rim 12 has no teeth containing retention band or other retention means for holding trim member 2 onto wheel 8, although it is contemplated that outer rim 12 will have an annular stop ring 39 crimpingly or otherwise attached thereto which abuts against wheel rim 40 in opposition to an axially inwardly directed force exerted against retainer plate 26 by lock bolt 6 when the threaded shank thereof is rotated in a direction so as to draw lock bolt 6 into nut 50. A pin 58 can extend through aligned apertures in retainer plate 26 and lock bracket 4 to prevent rotation of trim member 2 with respect to lock bracket 4.

Now referring to FIGS. 8-11, an alternative embodiment of a wheel trim assembly of the present invention is shown and indicated generally by the numeral 101. Wheel trim assembly 101 broadly comprises annular trim member 102, central hub member or lock bracket 104 and lock bolt 106.

Trim member 102 has an annular lower casting 110 which is clampingly secured between a generally dish-shaped top casting 108 and an annular backing plate 112 by means of a plurality of circumferentially spaced bolts 114. Backing plate 112 has a generally axially outwardly extending flange portion 116. An annular retention band 118 is crimpingly attached to the radially outer edge of backing plate 112 and extends generally axially inwardly. A plurality of retention clips 120 are circumferentially spaced on retainer ring 118 in a conventional manner to bitingly engage an associated wheel rim to aid in retaining trim member 102 thereon. Trim member 102 is intended to present the appearance of a spoked wheel and for this purpose has a plurality of axial outer spokes 124 and axial inner spokes 126 extending generally radially between flange portion 116 and top casting 108 and annular shoulder 128 of backing plate 112. Top casting 108 has a centrally located aperture 130 which provides access to the outer end of lock bolt 106 in a manner analogous to the previously disclosed embodiment. To conceal lock bolt 106 from casual view, to increase the aesthetic appeal of wheel trim assembly 101, and to minimize entrance of dirt, salt, water and so forth into the hollow interior 132 of wheel cover assembly 101, a cover member 134 is removably attached to the axial outer side of top casting 108 to cover aperture 130 as by spring clips or other conventional fastening means. Disposed within hollow interior 132 of trim member 102 is lock bolt retainer 138 which can be made of plastic material and which has a hollow tubular interior which guidably receives upper shank portion 140 of lock bolt 106. Thus, lock bolt retainer 138 has a cylindrically shaped hollow interior 142 which is of greater diameter than lock bolt 106 but has a narrow neck portion 141 which is of a diameter substantially equal to that of lock bolt 106. Lock bolt retainer 138 has feet portions 144 which are snappingly retained in corresponding apertures 145 in cover retaining plate 112 to attach retainer 138 thereto.

Lock bolt 106 is provided with a relatively long shank 140 of sufficient length to traverse a substantial portion of the distance between wheel cover retaining plate 112 and top casting 108 to facilitate manipulation of lock bolt 106 with a suitable wrench inserted through aperture 130. The axially outer end of lock bolt 106 is cylindrical and has a transverse face 146 with a channel 148 therein as in the previously disclosed embodiment. Channel 148 has end walls 150 and 152 and is coursed in face 146 so as to follow an irregular course of varying distance from the center of face 146. Thus, in accordance with the present invention an appropriate key wrench such as is shown in FIGS. 21 and 22 having a surface with a projection or ridge corresponding to channel 148 is used to rotate lock bolt 106. Increased torque can be obtained by means of the end walls of the projection abutting against end walls 150 and 152 of channel 148.

As shown in FIG. 8, lock bracket 104 is of a construction similar to that of the lock bracket of the previous embodiment. Lock bracket 104 has leg portions 158 having apertures 160 in the free ends thereof each of which is adapted to freely receive a wheel lug bolt. Lock bracket 104 has a central opening 168 within which a nut 170 is disposed. Nut 170 is preferably welded, staked or otherwise fixedly secured within opening 168 in lock bracket 104 and has a threaded bore adapted to receive threaded shank of lock bolt 106 to secure trim member 102 thereto.

In a manner analogous to that of the previously disclosed embodiment, lock bracket 104 attaches to the lug bolts of an associated vehicle wheel and wheel trim member 102 is attached to lock bracket 104 by means of lock bolt 106 which is installed or removed by means of a suitable key wrench. In installation, retaining plate 112 of wheel trim member 102 is clampingly engaged between a serrated shoulder 174 of lock bolt 106 and annular ridge 176 of lock bracket 104.

Another embodiment of the wheel trim assembly of the present invention is shown in FIG. 12, and is indicated generally by the numeral 201. Wheel trim assembly 201 broadly comprises an annular wheel trim member 202, lock bracket 204 and center bolt 206. As in the embodiments previously discussed, wheel trim assembly 201 presents the appearance of a wire wheel structure. However, wheel trim assembly 201 provides less theft resistance than the previously disclosed embodiments due to the use of a conventionally headed center bolt rather than a lock bolt. It should be noted, however, that if desired conventionally headed center bolt 206 may be replaced with a theft inhibiting lock bolt generally of the type previously disclosed.

Trim member 202 comprises top casting 208, middle casting 210 and lower casting 212 and has a plurality of circumferentially spaced upper spokes 214 extending generally radially between an annular outer ring 217 and middle casting 210 and another plurality of circumferentially spaced lower spokes 216 extending generally radially between outer ring 217 and lower casting 212. Middle casting 210 is clampingly secured between top casting 208 and lower casting 212 by a plurality of circumferentially spaced bolts 218. Top casting 208 has a center aperture 220 which provides access to hollow interior 222 of trim member 202 and hence to bolt 206 from the axially outer side of trim member 202. Not shown in FIG. 12, but contemplated for use therewith, is a cover member similar to cover member 134 shown in FIG. 8 which can be removably attached to top casting 208 in recess 224 to provide a cover for aperture 220. Lower casting 212 has a large, centrally disposed opening 228 into which the axially outer portion of lock bracket 204 extends without interference. Middle casting 210 has a central bore 230 through which the threaded shank of bolt 206 freely extends but which is of a diameter less than that of the headed portion of bolt 206. Also, as best seen with reference to FIG. 12, middle casting 210 has a generally cylindrical shaped central portion surrounding central bore 230 which aids in generally aligning lock bolt 206 with central bore 230 and aperture 220.

Lock bracket 204 is analogous in construction to that of the previous embodiments. Thus, lock bracket 204 has a generally bowl-shaped central portion 236 and a plurality of circumferentially spaced legs 232 extending radially outwardly therefrom. Each leg 232 has an aperture 233 therein adapted to freely receive a lug bolt of an associated wheel. As shown in FIG. 12, apertures 233 are of sufficient diameter so as to not interfere with the engagement of wheel lug nut 234 with vehicle wheel 246 but nevertheless sufficiently small to provide a secure attachment of lock bracket 204 to the axially outwardly facing surface of vehicle wheel 246. Such a non-interference fit is contemplated to be the case with all of the embodiments disclosed herein and can be facilitated by use of a conical or flanged wheel nut. Central portion 236 of lock bracket 204 has a central aperture 238 adapted to freely receive bolt 206 and an aperture 240 adapted to receive an index pin 242 which is welded or otherwise fixedly secured to lock bracket 204 and which extends into an aligned bore 244 in middle casting 210 to prevent rotation of trim member 202 with respect to lock bracket 204. Welded, staked or otherwise fixedly secured to the axially inwardly facing side of lock bracket 204 is nut 248 which has a threaded bore coaxial with aperture 238 and which is adapted to threadably receive bolt 206 as in the previously described embodiments.

Center bolt 206 has a head portion 250 which can be of cylindrical configuration with channelled face as in previous embodiments or can be a conventional hexagon-shaped head as shown in FIG. 12. It will be appreciated that use of the hexagon-shaped head shown results in decreased theft resistance but the embodiment of FIG. 12 still has advantages of secure center retention and some theft resistance is provided by concealing bolt head 250 from casual view.

Other alternative center bolt fastening means are disclosed in FIGS. 13 and 14. Thus, in FIG. 13 a lock bolt 256 is illustrated attaching an annular trim member 252 to a lock bracket 262. Lock bolt 256 has a channelled head portion 254 as described in previously disclosed lock bolts 6 and 106 and has transverse pins 258 which engage corresponding notches formed by shoulders 260 in lock bracket 262 in the manner of a conventional bayonet fastener. It will be appreciated that lock bolt 256 is urged axially outwardly to the left as shown in FIG. 13 by the axial outward force exerted against the outer circumferential portion of trim member 252 by an associated wheel, thus ensuring that pins 258 will not freely rotate past shoulders 260.

Referring to FIG. 14, a center bolt 270 is illustrated attaching lock bracket 268 to trim member 266 wherein center bolt 270 has a headed portion 271 fixedly attached to the axially inner side of lock bracket 268 and a threaded portion extending in an axial outward direction. In this embodiment, a nut 272 is threadably attached to the threaded shank of center bolt 270 to secure trim member 266 to lock bracket 268.

Now referring to FIGS. 19 and 20, yet another embodiment of a wheel trim assembly of the present invention is shown and indicated generally by the numeral 301. Wheel trim assembly 301 broadly comprises wheel trim member 302, lock bracket 304 and lock bolt 306.

Trim member 302 has a top casting 308, a middle casting 310 and a lower casting 312. Top casting 308 is removably attached to middle casting 310 by a plurality of circumferentially spaced spring clips 324 while middle casting 310 is secured to lower casting 312 by a plurality of circumferentially spaced bolts 326. An annular member 314 is attached to the axially inner side of lower casting 312 by a plurality of circumferentially spaced bolts 328. Extending generally radially between outer flange portion 316 of member 314 and middle casting 310 are a plurality of circumferentially spaced upper spokes 318. Extending generally radially between outer flange portion 316 and an annular radially outwardly facing shoulder portion 322 of annular member 314 are a plurality of circumferentially spaced lower spokes 320. Lower casting 312 has an annular member secured thereto by bolts 326 as shown in FIG. 19 on which is provided a centrally located cylindrical shaped recess 330, the axially inner end of which has radially inwardly turned portions adapted to engage the headed end of lock bolt 306 and having a central aperture 332 through which the threaded shank of lock bolt 306 freely extends. Crimpingly secured to the outer edge of outer flange portion 316 of member 314 is retention band 334 which has a plurality of circumferentially spaced teeth 336 adapted to bitingly engage a radially inwardly facing portion of a wheel to provide circumferentially located retention means.

Lock bracket 304 is generally bowl-shaped with a plurality of radially outwardly extending legs 338 each having an aperture 340 therein with a nut 342 fixedly secured thereto with threaded bore in alignment with the associated aperture 340. Thus, lock bracket 304 is adapted to atach directly to a wheel by suitable bolts or screw fastening means separate and distinct from the lug bolts or lug nuts. Lock bracket 304 also has a centrally disposed aperture adapted to freely receive the threaded shank of lock bolt 306 and which has a nut 333 fixedly attached as by welding to the axially outer side thereof with a coaxial threaded bore adapted to threadably engage the threaded shank of lock bolt 306 which has a head portion with a channel in the axially outer face thereof and is generally of a construction analogous to that of lock bolt 6 shown in FIGS. 1–7.

A suitable tool or wrench for use in manipulating to effect rotation of lock bolts 6, 106, 256 and 306 disclosed herein is shown in FIGS. 21 and 22 and indicated generally by the numeral 350. Wrench 350 is generally L-shaped in side elevation and has a handle portion 354 and an operating portion 352. Operating portion 352 has a tubular end having a hollow interior 355 into which key 357 is press fit or otherwise fixedly attached so as to preclude rotation of key 357 with respect to wrench 350. Key 357 has a ridge or projection 356 extending outwardly from face 359 and adapted to fit into a correspondingly shaped groove or channel in the axially outwardly facing surface of a lock bolt as described hereinbefore. In addition, operating portion 352 can have a tubular extension 358 which is adapted to coaxially fit over the outer circumference of the headed portion of a lock bolt to facilitate alignment of wrench 350 and the lock bolt.

Now referring to FIGS. 12, 15–18 and 23–33, a plurality of alternate means for axially and radially positioning the wheel trim member with respect to the vehicle wheel and/or preventing rotation of the wheel trim member with respect to the central hub member and hence the vehicle wheel are disclosed. Of course, it will be readily appreciated by those skilled in the art that the alternate positioning and/or anti-rotation means disclosed hereinafter are easily and readily adaptable for use with the embodiments of wheel trim assemblies disclosed herein as well as with analogously designed assemblies and such modifications are contemplated to be within the broad scope of the present invention.

FIGS. 12 and 15–18 disclose various anti-rotation means which are located generally between the outer circumference of the wheel trim member and an associated wheel and which also serve as locating and stop means for the wheel trim member when the center bolt is tightened to urge the trim member towards the wheel. Thus, in FIG. 12 an annular plastic ring 278 is urged against wheel 246 when bolt 206 is tightened and which operates to prevent potential noise generating vibration of the outer periphery of the wheel trim against the vehicle wheel as well as to inhibit relative rotation due to the frictional engagement thereof with vehicle wheel 246. In FIG. 15 anti-rotation means is shown comprising a plurality of circumferentially spaced spring-biased dampening tabs 280 each of which is biased radially outwardly from an annular plastic positioning stop member 282 against the rim of wheel 246.

In FIG. 16, anti-rotation means is shown comprising a stop and dampening annular pad 286 made of compressible, resilient material such as rubber which is glued or otherwise attached to the axially inwardly facing end 288 of annular positioning stop member 284. Alternately, a plurality of circumferentially spaced pads 286 can be employed.

FIG. 17 illustrates anti-rotation means comprising a plurality of pairs of arcuate segments or a pair of annular rings of hook and loop fasteners (such as Velcro ® fasteners) 290 and 292 fixedly attached respectively to positioning stop member 294 and wheel 246 respectively.

FIG. 18 shows yet another anti-rotation means comprising a spring guide, damper and stop 295 which is crimpingly secured to an annular ring 296, analogous to outer ring 217 shown in FIG. 12. Spring guide, damper and stop 295 is spring biased radially outwardly against the radially inner face of wheel 246.

Now referring to FIGS. 23–33, alternative anti-rotation means are shown located between the annular trim member and the lock bracket. All of the anti-rotation means shown in FIGS. 23–33 provide a great number, in some cases an infinite number, of suitable rotational positions of the trim member with respect to the central hub member. Thus, anti-rotation is obtained without use of alignment pins which must be inserted through corresponding holes. As will be readily appreciated by those in the art, the anti-rotation means of FIGS. 23–33, as well as those of FIGS. 12 and 15–18, avoid any problem regarding alignment of the trim member with a tire valve stem and cooperating anti-rotation means of the central hub member. Since the location of valve stem holes in wheels varies from wheel to wheel and hence is not always positioned in the same radial position relative to the wheel lug bolts to which the central hub member is attached, it is advantageous to have anti-rotation means having such a multiplicity of rotational locations that the radial angle between adjacent indexing locations is less than the radial angle tolerance permitted in location of the valve hole by the wheel manufacturer.

Thus, in FIG. 23 spoke retainer 402 has retainer plate 404 attached thereto by a plurality of fasteners 406 in a manner like that of wheel trim member 2 shown in FIG. 1 and retainer plate 404 is attached to a central hub member 408 by lock bolt 410 which threadably engages nut 412. Radially outwardly from lock bolt 410, a hook and loop fastening means such as Velcro ® or the like is glued or otherwise attached to the axially inner side of retainer plate 404 and the axially outer side of central hub member 408 to prevent unwanted rotation of one with respect to the other. Thus, a plurality of circumferentially spaced Velcro ® type hook members 414 are glued or otherwise fixedly attached to retainer plate 404 and are located so as to be in engaged and interlocking relationship with aligned Velcro ® loop members 416 which are glued or otherwise fixedly attached to central hub member 408. As will be readily appreciated by those skilled in the art, the hook and loop Velcro ® fastening material 414 and 416 prevents rotational movement of retainer plate 404 with respect to central hub member 408 while allowing easy removal of retaining member 404 in an axially outward direction when central lock bolt 410 is threadably disengaged.

FIGS. 24–26 show another anti-rotation option for means for preventing rotation of a wheel trim member 501, shown broken away, having a retainer plate 502 which is centrally mounted onto a central hub member 504 and retained thereon by a central retaining bolt 506 which threadably engages nut 508 which is fixedly attached to central hub member 504. The anti-rotation option of FIGS. 24–26 employs a pair of annular gear rings 510 and 512 which can be made of rubber or plastic or other suitable material. Annular ring 510 is fixedly attached to the axially inner side of retainer plate 502 by a plurality of studs 518 which are integrally formed with annular ring 510 and which are extended through corresponding apertures 519 and then headed as by heating to form a large headed portion which is larger than aperture 519. In an analogous manner, annular ring 512 is fixedly attached to central hub member 504 by means of a plurality of stud members 520 which are integrally formed with annular ring 512 and which are adapted to extend through corresponding apertures 521. Rotation of annular gear ring 510 with respect to retainer plate 502 and rotational movement of annular gear ring 512 with respect to central hub member 504 is prevented by a plurality of embossments 522 and 524 which mate with a plurality of corresponding recessed portions 523 and 525 in annular gear rings 510 and 512 respectively. Unwanted rotational movement between annular gear ring 510 and annular gear ring 512 is prevented by the meshing of radially inwardly facing gear teeth 514 integrally formed with annular gear ring 510 and radially outwardly facing gear teeth 516 integrally formed with annular gear ring 512. As is shown best in the broken away portion of FIG. 25, gear teeth 514 and 516 can have a rounded tooth configuration and are radially opposed and evenly circumferentially spaced around respective annular gear rings 510 and 512. Optionally, gear teeth 514 and 516 can have a pointed tooth configuration as shown in FIG. 26, as teeth 514a and 516a.

Another anti-rotation means is shown in FIG. 27 where a spoke retainer 602 and retainer plate 604 are shown in association with a center hub member 606, central threaded bolt 608 and threaded nut 610 which is fixedly attached to central hub member 606. In the embodiment shown in FIG. 27, rotation of retainer plate 604 with respect to central hub member 606 is prevented by providing serrations or grooves formed, cut or coined into respective facing portions 612 and 614. It will be appreciated that for best results the grooves should be radially and circumferentially aligned, evenly spaced and adapted to match and mesh with the corresponding opposite facing grooves. The grooves or serrations can have a pointed configuration or a curved, rounded or bent configuration.

The anti-rotation means shown in FIGS. 28–30 is somewhat similar to that shown in FIGS. 24 through 26 and described above and is operative to prevent unwanted rotation of a wheel trim member having an axially inwardly located retainer plate 702 with respect to a central hub member 704. Retainer plate 702 is centrally attached to central hub member 704 by a threaded central bolt 706 which threadably engages nut 708 which is fixedly attached to central hub member 704. In the embodiment shown in FIG. 28, a pair of annular gear rings 710 and 712 are attached respectively to retainer plate 702 and central hub member 704. Annular gear ring 710 is fixedly attached to retainer plate 702 by a plurality of circumferentially spaced studs 718 which extend through apertures 719 and are headed by heating or other means. Similarly, annular gear ring 712 is fixedly attached to central hub member 704 by a plurality of studs 720 extending through apertures 721. A plurality of circumferentially spaced recesses 714 in retainer plate 702 which receive corresponding projections 715 in annular gear ring 710 assist studs 718 in preventing rotation of gear ring 710 with respect to retainer plate 702. In an analogous manner recesses 716 receive projections 717 to assist studs 720 in preventing rotation of gear ring 712 with respect to central hub member 704. Gear rings 710 and 712 each have a plurality of teeth 711 and 713 which respectively face axially inwardly and outwardly and are in facing and meshing relationship with respect to each other. As in the previous embodiments, it will be appreciated that the teeth 711 and 713 can have a pointed tooth configuration as shown in FIG. 30 or other suitable gear configuration such as a rounded configuration as shown in FIG. 31 as teeth 711a and 713a.

Yet another embodiment of means for preventing rotation between the wheel trim member and a central hub member is shown in FIGS. 32 and 33 wherein a wheel trim member having an axially inner retainer plate 802 is centrally attached to a central hub member 804 by means of threaded bolt 806 which threadably engages nut 808 fixedly attached to central hub member 804. As shown in FIGS. 32 and 33, an annular friction ring 810 is glued or otherwise adhesively attached to central hub member 804. A plurality of dimples or other projections 812 are provided in central hub member 804 and extend axially outwardly into friction ring 810 to provide additional structural support therebetween. In addition, friction ring 810 has a plurality of pins 818 which extend through corresponding apertures 819 in central hub member 804 to locate and assist in securing friction ring 810 with respect to central hub member 804. Central hub member 804 also has a plurality of radially extending recessed embossments 816 into which corresponding projections 814 of friction ring 810 extend. Thus, friction ring 810 is securely mounted onto central hub member 804 and any rotational movement therebetween is prevented. Rotation of retainer plate 802 with respect to friction ring 810 is prevented by a plurality of radially extending embossments 820 which project axially inwardly against friction ring 810 when central bolt 806 is tightened to draw retainer plate 802 axially inwardly with respect to central hub member 804 and to secure wheel trim member with respect to the central hub member 804.

Referring now to FIG. 34, there is shown a wheel trim 824 similar to that shown in FIG. 1 but incorporating a modified embodiment of the anti-rotation arrangements shown in FIGS. 24 through 25 and 28 through 31. Accordingly, like portions of wheel trim 824 are indicated by the same numbers used in FIG. 1 primed.

The anti-rotation arrangement shown comprises inner and outer gear rings 826, 828 secured respectively to a modified lock bracket 830 and a modified retainer plate 832 which retainer plate is in turn secured to top and lower castings 18' and 16' by means of a plurality of fasteners 24' and 854.

As best seen with reference to FIGS. 35 and 36, outer gear ring 828 is preferably fabricated from a suitable polymeric composition such as ABS plastic or the like and includes a relatively wide generally conical wall portion 834, the inner surface of which is provided with a plurality of relatively small generally axially extending radially inwardly facing gear teeth 836. Preferably gear teeth 836 will be equally spaced around the entire inner periphery of conical wall portion 834 and coextensive with the axial length thereof. Also, a 2° pitch between teeth is preferred in order to provide a sufficiently small incremental positioning of the wheel trim to accommodate the variance in positioning of valve stem 838 and yet still insure sufficient strength in the teeth to effectively resist relative rotation of trim member 824 with respect to lock bracket 830. A generally radially extending flange portion 840 is integrally formed with conical wall portion 834 and extends outwardly from the axially inner edge thereof. A plurality of substantially identical legs 842 extend radially outwardly from the outer periphery of flange portion 840 being positioned in circumferentially spaced relationship, each of which includes a tapered generally axially outwardly extending projection 844. A notch 846 is provided along the radially outer surface of projection 844 intermediate the ends thereof. Outer gear ring 828 also has a plurality of axially elongated lugs 848 extending radially outwardly from the outer surface of conical sidewall 834 and spaced circumferentially therearound, each of which has a relatively large circumferential dimension.

Retainer plate 832 has an outer radially extending flange portion 850 which is provided with a plurality of fastener accommodating openings 852 provided therein spaced around the circumference adjacent the outer edge thereof which are adapted to receive fasteners 854 for securing it to wheel trim 824. Also, a plurality of additional openings 856 are also provided positioned radially inwardly from fastener receiving openings 852 and substantially equally circumferentially spaced around the periphery thereof. Openings 856 are sized and positioned to receive respective projections 844 provided around the outer periphery of gear ring 828, the notched portion 846 of which will snap over the outer edge of the respective openings 856 so as to secure gear ring 828 to retainer plate 832.

A generally conical sidewall portion 858 extends generally axially outwardly from the radially inner edge of flange portion 850 and has a plurality of axially extending grooves 860 formed thereon which are sized and positioned to receive respective lugs 848 provided on the periphery of gear ring 828 so as to prevent relative rotation of gear ring 828 with respect to wheel trim 824. The number and/or size of these lugs and associated grooves may be selected so as to provide sufficient strength to prevent such relative rotation. The conical wall portion 858 of retainer plate 832 will also be sized so as to enable the outer surface 862 of gear ring 828 to seat thereagainst with the radial flange portion 840 of gear ring 828 engaging the inner periphery of radial flange portion 850 of retainer plate 832 so as to limit axial inward movement of gear ring 828 with respect to retainer plate 832.

It should also be noted that the axially and radially inner edge 864 of gear ring 828 will preferably be provided with a generous radius so as to facilitate installation of the wheel trim assembly.

Referring now to FIG. 39, lock bracket 830 comprises a generally cup-shaped body portion 866 from which a plurality of substantially identical legs 868 project generally radially outwardly. Each of legs 868 is provided with suitable openings 870 for receiving wheel securing studs whereby lock bracket 830 may be secured to the axially outwardly facing surface of a vehicle wheel through the agency of lug nuts 872.

Body portion 866 includes a generally cylindrical axially extending sidewall 874 which has a plurality of substantially equally circumferentially spaced radially outwardly projecting and axially inwardly extending lugs 876 formed thereon which divide the cylindrical sidewall 874 into a plurality of segments.

Inner gear ring 826 also is preferably fabricated from a suitable polymeric composition such as for example ABS plastic and has a generally cylindrical axially extending inner sidewall surface 878 which is provided with a plurality of axially extending grooves 880 which are suitably sized and positioned so as to receive respective lugs 876 formed on lock bracket 830 and cooperate therewith to effectively prevent relative rotation of gear ring 826 with respect to lock bracket 830.

In order to aid in assembling and securing inner gear ring 826 to lock bracket 830, a plurality of tab portions 882 are provided on the periphery thereof, each being defined by a pair of circumferentially spaced slots 884, 886 extending outwardly from the axially inner edge 888 thereof. A radially inwardly extending button 890 is integrally formed on each tab portion 882 adjacent axially inner edge 888 thereof which is adapted to be received within a suitably sized and positioned opening 892 provided in the cylindrical sidewall 874 of lock bracket 830 when gear ring 826 is assembled thereto and to thereafter aid in preventing relative axial movement therebetween.

The outer periphery of inner gear ring 826 is, of course, provided with a plurality of teeth 894 designed to meshingly engage teeth 836 provided on outer gear ring 828 upon assembly of wheel trim 824 to lock bracket 830. As shown, teeth 894 are discontinuous at the locations of tab portions 882. This is to enable the wall thickness of inner ring 826 to be reduced slightly in these areas whereby tab portions 882 may more easily be deflected radially outwardly as gear ring is slid over body portion 866 of lock bracket 830 during assembly. Of course as gear ring 826 is fully seated on lock bracket 830, tab portions 882 will move radially inwardly as buttons 890 are moved into and seated in the respective openings 892 in the cylindrical sidewall portions 874 of lock bracket 830.

As wheel trim 824 is assembled to lock bracket 830, it will first be angularly oriented so as to bring the valve stem opening provided in flange 12' into alignment with valve stem 838, thereafter the center lock bolt will be moved into engagement with and threaded into a nut secured to lock bracket 830. As the lock bolt and nut are brought into engagement inner and outer gear rings 826, 828 will also be radially and circumferentially aligned and respective teeth 836, 894 moved into meshing engagement. As lock bolt is fully tightened so as to secure wheel trim 824 to the vehicle wheel, respective gear rings 826, 828 will be moved into substantially full engagement with each other and thereafter cooperate to effectively prevent relative rotational movement of trim member 824 with respect to lock bracket 830 and hence the vehicle wheel.

Referring now to FIG. 43, a modified embodiment of an anti-rotation arrangement for preventing relative rotation between the wheel trim 896 and associated vehicle wheel is illustrated which is similar to that described above with reference to FIG. 32.

In this embodiment, a lock bracket 898 of the general type previously described is provided which has an annular radially outwardly opening groove or recess 900 of generous axial width provided thereon. The radially inner surface 902 in part defining the groove 900 has a plurality of axially elongated ribs 904 thereon preferably projecting radially outwardly slightly so as to provide an irregular surface contour. Seated within groove 900 is a resilient compressible rubber ring 906 of generous proportions preferably being fabricated from a suitable synthetic material such as a butyl material. Preferably, rubber ring 906 will have a diameter slightly less than that of groove 900 and will require a slight stretching thereof in order to seat it therein.

Retainer plate 908 secured to wheel trim 896 also has a generally axially extending annular surface portion 910 formed thereon which is designed to be positioned in opposed facing relationship to groove 900 and to compressively engage rubber ring 906. Suitable generally axially extending ribs, grooves or undulations 912 will also preferably be provided on surface 910 so as to form an irregular surface thereon.

When wheel trim 896 is secured to the lock bracket 898, rubber ring 906 will be compressed between the irregular surface 912 of retainer plate 908 and that of groove 900 thereby effectively inhibiting relative rotation therebetween.

It should be noted that, if desired, rubber ring 906 may be secured within groove 900 by a suitable adhesive in place of axially extending ribs or in addition thereto. Alternatively, the desired irregular surface may be provided by other means such as indentations, serrations or the like.

Another anti-rotation arrangement is shown in FIGS. 44 and 45 in which the retainer plate 914 forming a part of the wheel trim 916 is provided with a plurality of generally radially inwardly extending projections 918 spaced circumferentially therearound. In this embodiment, lock bracket 920 includes an axially extending ribbed annular surface portion 922 having a plurality of closely spaced axially extending ribs 924 formed thereon which are adapted and positioned so as to receive respective protrusions 918 in the grooves 926 defined by adjacent ribs 924. Thus, the protrusions 918 and ribs 924 will cooperate to inhibit relative rotational movement between the trim member 916 and associated lock bracket 920. By providing a relatively small angular pitch between adjacent ribs 924, it is possible to easily accommodate most any angular positioning of the valve hole and associated valve stem relative to the vehicle wheel.

A still further anti-rotation arrangement is shown in FIGS. 46 and 47 wherein a lock bracket 926 is provided which has a generally axially extending surface portion 928 provided with a plurality of axially extending grooves 930 spaced circumferentially therearound. In this embodiment, one or more generally V-shaped spring clips 932 having outwardly extending diverging legs 934, 936 is provided. Suitable clip mounting means such as a tubular sleeve 938 is secured thereto between legs 934, 936. A fastener 940 is provided which extends through tubular sleeve 938 to secure clip 932 to wheel trim 942. When wheel trim 942 is installed on the vehicle wheel to which lock bracket 926 has been secured, legs 934, 936 will be received within respective of groove 930 and thereafter cooperate therewith to effectively inhibit relative rotation of the wheel trim 942.

Thus, it is readily apparent that the present invention provides an improved construction for theft resistant wheel trim which can be economically manufactured and which avoids use of locking devices of a type which tend to fail after repeated exposure to road salt and the like.

While it is therefore apparent that the preferred embodiments of the invention disclosed above are well calculated to achieve the objects of the present invention, it will be appreciated that the invention is susceptible to modification, variation and change without departing from the proper scope or fair meaning of the subjoined claims.

We claim:

1. A wheel trim assembly comprising: a trim member having inner and outer portions, each of said portions having a centrally disposed opening therethrough; a central hub member adapted to be attached to a vehicle wheel; center retention means positioned between said inner and outer portions and having an inner end rotatively removably engaged with said hub member for securing said trim member to said hub member; and positioning means secured to one of said inner and outer portions and having an opening extending therethrough substantially axially aligned with said openings in said inner and outer portions, said center retention means being movably retained by said positioning means in alignment with said openings in said inner and outer portions, said positioning means having a restricted portion, said restricted portion being operative to limit axial outward movement of said center bolt retention means; and a removable cover member adapted to cover said center centrally disposed opening therethrough.

2. A wheel trim assembly as set forth in claim 1 wherein said positioning means comprises a hollow cylinder and is secured in position with the axis of said hollow cylinder being substantially aligned with the axis of said openings in said inner and outer portions.

3. A wheel trim assembly as recited in claim 1 wherein said center retention means has an outer end with a transverse face, said face having a groove therein adapted to receive a corresponding projection of a torque tool to rotate said center retention means relative to said hub member for installation or removal of said trim member with respect to said vehicle wheel.

4. A wheel trim assembly as recited in claim 3 wherein said groove has portions located at varying distance from the center of said transverse face.

5. A wheel trim assembly as recited in claim 3 wherein said groove has a pair of ends and is in the form of a discontinuous channel.

6. A wheel trim assembly as recited in claim 5 wherein said positioning means is fixedly attached to said inner portion of said trim member.

7. A wheel trim assembly as recited in claim 6 wherein said trim member comprises a plurality of circumferentially spaced generally radially extending spoke members and an annular stop band, said spoke members extending between said stop band and one of said inner and outer portions of said trim member.

8. A wheel trim assembly as recited in claim 7 wherein said stop band is adapted to come into abutting relationship with an associated wheel before said inner portion comes into abutting relationship to said central hub member.

9. A wheel trim assembly as recited in claim 8 wherein said center retention means comprises a bolt, said inner end comprising a threaded shank extendable axially inwardly through said central opening in said inner portion and a threaded nut fixedly attached to said central hub member adapted to threadably receive said threaded bolt.

10. A wheel trim assembly comprising: a trim member having axially spaced inner and outer portions and sidewalls together generally defining a chamber, each of said portions having an opening therethrough; a central hub member adapted to be attached to the outer side of a vehicle wheel; center retention means having a first element disposed between said inner and outer portions, and a second element fixedly associated with said hub member, one of said first and second elements extending through said opening in said inner portion and being detachably connected to the other of said first and second elements to attach said trim member to said hub member; and a retaining member secured to one of said inner and outer portions, said retaining member including a portion operative to restrict axial movement of said first element.

11. A wheel trim assembly as recited in claim 10 wherein said one of said first and second elements is a threaded shank and said other of said first and second elements comprises a bore having a threaded inner surface adapted to threadably engage said threaded shank.

12. A wheel trim assembly as recited in claim 10 wherein said retaining member comprises a generally cylindrically shaped elongated member secured to one of said inner and outer portions.

13. A wheel trim assembly as recited in claim 12 wherein said retaining member is made of a polymeric material.

14. A wheel trim assembly as recited in claim 10 further comprising anti-rotation means for preventing relative rotation of said trim member with respect to said hub member.

15. A wheel trim assembly as recited in claim 14 wherein said anti-rotation means comprise wheel engaging means secured to the periphery of said trim member.

16. A wheel trim assembly as recited in claim 15 wherein said wheel engaging means comprise an annular band having a plurality of generally radially outwardly projecting teeth engageable with a portion of said vehicle wheel.

17. A wheel trim assembly comprising: a trim member having inner and outer portions, each of said portions having an opening therethrough; a central hub member having a bore aligned with said opening in said inner portion and being adapted to be attached to the outer side of a vehicle wheel; center retention means comprising a first element including a threaded shank and a second element including a threaded bore, one of said first and second elements being disposed between said inner and outer portions of said trim member, and the other of said first and second elements being fixedly associated with said hub member, said threaded shank being extendable through said opening in said inner portion and into threaded engagement with said threaded bore to attach said trim member to said central hub member; and a polymeric composition retaining member having a generally cylindrical hollow interior adapted to receive said one of said first and second elements of said retention means and to loosely retain said one element between and in generally axially aligned relationship with said openings in said inner and outer portions, said retaining member being disposed between and fixedly associated with one of said inner and outer portions and having a narrow neck portion adapted to cooperate with said one of said first and second elements of said center retention means to limit axial outward movement thereof.

18. A wheel trim assembly as recited in claim 17 wherein said one of said first and second elements has an axially inwardly directed face portion with serrations therein operative to inhibit relative rotation between said one and said other of said first and second elements when said elements are in mutually threaded engagement.

19. A wheel trim assembly comprising: a trim member having inner and outer portions, each of said portions having a centrally disposed opening therethrough; a central hub member adapted to be attached to a vehicle wheel; center bolt retention means having an outer end positioned between said inner and outer portions and an inner end rotatively removably engaged with said hub member for securing said trim member to said hub member; elongated retaining means secured between said inner and outer portions and having an opening extending therethrough substantially axially aligned with said openings in said inner and outer portions, said outer end being movably retained by said retaining means in alignment with said openings in said inner and outer portions, said retaining means having a restricted portion adjacent the axially outer end thereof, said restricted portion being operative to limit axial outward movement of said center bolt retention means; and a cover member removably attached to the outer side of said outer portion and adapted to cover said centrally disposed opening therethrough.

20. A wheel trim assembly as recited in claim 19 wherein said restricted portion comprises a wall portion projecting into said opening and defining a generally axially inwardly facing shoulder engageable with a generally axially outwardly facing surface portion of said center bolt retention means.

21. A wheel trim assembly as recited in claim 20 wherein said inner member has a portion overlying a portion of the axially inner end of said opening in said retaining means and cooperating therewith so as to limit axial inward movement of said center bolt retention means whereby said center bolt retention means is retained within said opening.

22. A wheel trim assembly as recited in claim 21 wherein said retaining means is secured to said inner portion.

23. A wheel trim assembly comprising:
a center hub member adapted to be secured to an axially outwardly facing surface of a vehicle wheel,
a trim member including
an inner portion having an opening therethrough;
an outer portion having an opening therethrough;

means securing said inner and outer portions together with said openings positioned in generally axially aligned relationship;

a cover member attached to said outer portion overlying said opening therethrough and axially spaced from said inner portion;

an axially elongated retaining means having an opening extending therethrough disposed between said inner portion and said cover member, said opening being generally coaxial with said centrally disposed openings in said inner and outer portions; and center retention means including first and second detachable elements, said first element being movably disposed within said opening in said retaining means and said second element being attached to said hub member, whereby said first and second elements can operate to secure said wheel trim to said vehicle wheel, said retaining means further including means for limiting the axial outward movement of said first detachable element.

24. A wheel trim assembly as recited in claim 23 wherein said retaining means is secured to said inner portion and is operative to restrict movement of said first element so as to maintain said first element in generally axially aligned relationship with said openings in said first portion.

25. A wheel trim assembly as recited in claim 24 wherein said retaining means is fabricated from a polymeric composition.

26. A wheel trim assembly as recited in claim 23 wherein said axial movement limiting means comprise an axially inwardly facing stop surface engageable with a portion of said first element to limit axial outward movement thereof.

27. A wheel trim assembly as recited in claim 23 wherein said opening in said inner member has a transverse size less than said opening in said retaining means and is operative to limit axial inward movement of said retaining means.

28. A locking device for securing a wheel cover to a vehicle wheel rim said wheel cover having a generally circular mounting plate including retention means at the peripheral portions thereof for mounting said wheel cover on said wheel rim and having a center cap mounted to said mounting plate, said device comprising in combination:

a first threaded fastener;

means for mounting said first threaded fastener to said wheel rim wherein the axis of the mounted fastener projects axially outwardly and through an opening in said mounting plate of said wheel cover;

a tubular member mounted inwardly from an access opening in said center cap of said wheel cover coaxially with said fastener; and a second threaded fastener slidably mounted in said tubular member and captured therein between said mounting plate and said center cap for unengaged movement toward and away from said first threaded fastener and being threadedly engageable therewith to limit the axially outward movement of said mounting plate with respect to said wheel rim.

29. The device according to claim 28, including a removable center member removably mounted on the external surface of said center cap for concealing said access opening.

30. The device according to claim 29, wherein the axially outward end of said second threaded fastener includes a torque tool engaging portion engageable with an external torque tool inserted through said access opening and into said tubular member when said removable center member is removed from said center cap.

31. A locking device for securing a wheel cover to a vehicle wheel rim said wheel cover having a generally circular mounting plate including retention means at the peripheral portions thereof for mounting said wheel cover on said wheel rim and having a center cap mounted to said mounting plate, said device comprising in combination:

a first threaded fastener;

means for mounting said first threaded fastener to said wheel rim wherein the mounted fastener is directed axially outwardly toward an opening in said mounting plate of said wheel cover;

a tubular member mounted inwardly from an access opening in said center cap of said wheel cover coaxially with said fastener; and a second threaded fastener slidably mounted in said tubular member and captured therein between said mounting plate and said center cap for unengaged movement toward and away from said first threaded fastener and being threadedly engageable therewith to limit the axially outward movement of said mounting plate with respect to said wheel rim.

32. The device according to claim 31, including a removable center member removably mounted on the external surface of said center cap for concealing said access opening.

33. The device according to claim 32 wherein the axially outward end of said second threaded fastener includes a torque tool engaging portion with an external torque tool inserted through said access opening and into said tubular member when said removable center member is removed from said center cap.

34. A locking device for securing a wheel cover to a vehicle wheel rim wheel cover having a generally circular mounting plate including retention means at the peripheral portions thereof for mounting said wheel cover on said wheel rim and having a center cap mounted to said mounting plate, said device comprising in combination:

a first fastener;

means for mounting said first fastener to said wheel rim wherein the mounted fastener is directed axially outwardly toward an opening in said mounting plate of said wheel cover;

a tubular member mounted inwardly from an access opening in said center cap of said wheel cover coaxially with said fastener; and a second fastener slidably mounted in said tubular member and captured therein between said mounting plate and said center cap for unengaged movement toward and away from said first fastener and being removably fixedly engageable therewith to limit the axially outward movement of said mounting plate with respect to said wheel rim.

35. The device according to claim 34, including a removable center member removably mounted on the external surface of said center cap for concealing said access opening.

36. The device according to claim 34, wherein said second fastener includes a torque tool engaging portion at the axially outwardly end thereof for engaging an external torque tool which is insertable through said access opening.

37. The device according to claim 36 further comprising a center member having a locating pin which projects through a second opening on said center cap for orientating said center member with respect to said center cap.

* * * * *